United States Patent
Kappl et al.

[11] 3,833,282
[45] Sept. 3, 1974

[54] MICROSCOPE TRANSMITTING LIGHT ILLUMINATION SYSTEM USING THE KOHLER SYSTEM

[75] Inventors: Gerhard Kappl, Vienna; Alois F. Dehlink, Vosendorf, both of Austria

[73] Assignee: C. Reichert Optische Werke AG, Vienna, Austria

[22] Filed: May 15, 1972

[21] Appl. No.: 252,989

[30] Foreign Application Priority Data
May 13, 1971 Austria ............................ A 4142/71

[52] U.S. Cl. .................... 350/87, 350/39, 350/187, 250/578
[51] Int. Cl. ........................................ G02b 21/08
[58] Field of Search .................. 350/87, 39, 187

[56] References Cited
UNITED STATES PATENTS
| | | | |
|---|---|---|---|
| 2,264,835 | 12/1941 | Flint | 350/87 |
| 2,782,683 | 2/1957 | Walker | 350/187 |
| 2,977,848 | 4/1961 | Malfeld | 350/87 |
| 3,541,941 | 11/1970 | Barr et al. | 350/187 X |
| 3,679,287 | 7/1972 | Takahashi et al. | 350/87 |

FOREIGN PATENTS OR APPLICATIONS
640,722  7/1950  Great Britain ....................... 350/87

Primary Examiner—David H. Rubin
Attorney, Agent, or Firm—Alan H. Spencer; William C. Nealon

[57] ABSTRACT

A Kohler illumination system for a microscope having a lens of variable focal length so as to vary the illumination to suit the field of view of any objective. The adjustment of the variable lens is initiated in response to a reference signal from the microscope nosepiece or from the particular objective which is in operative position.

1 Claim, 5 Drawing Figures

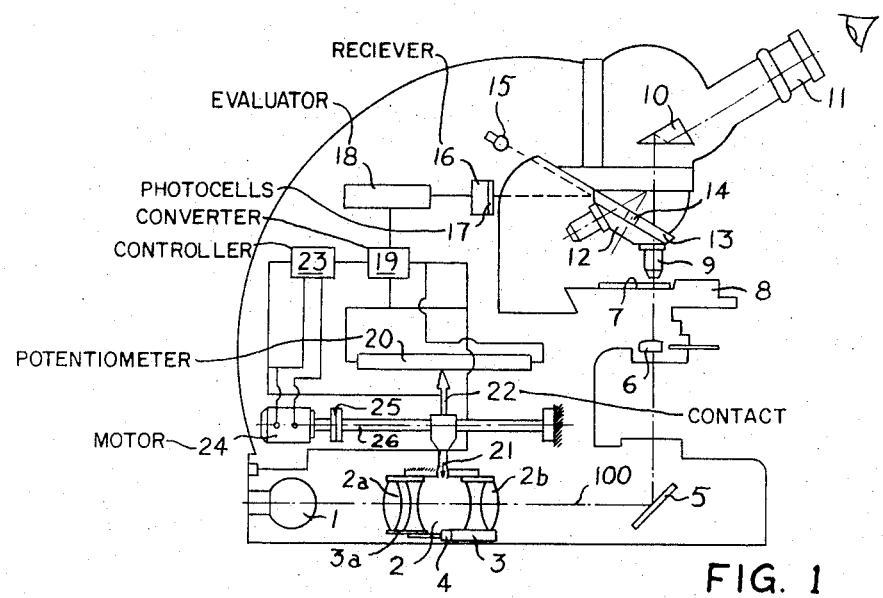
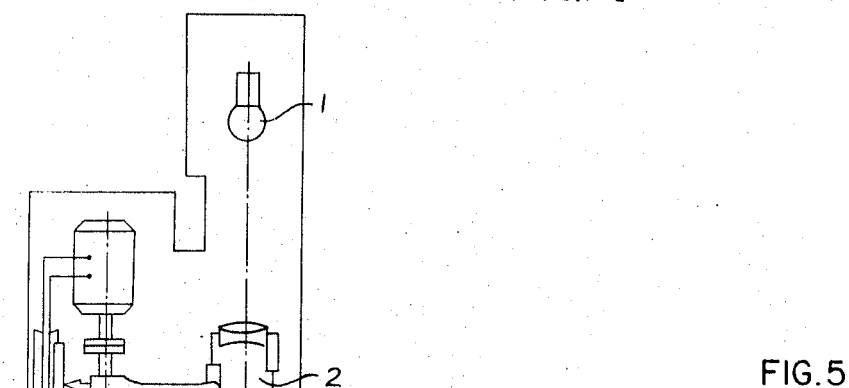
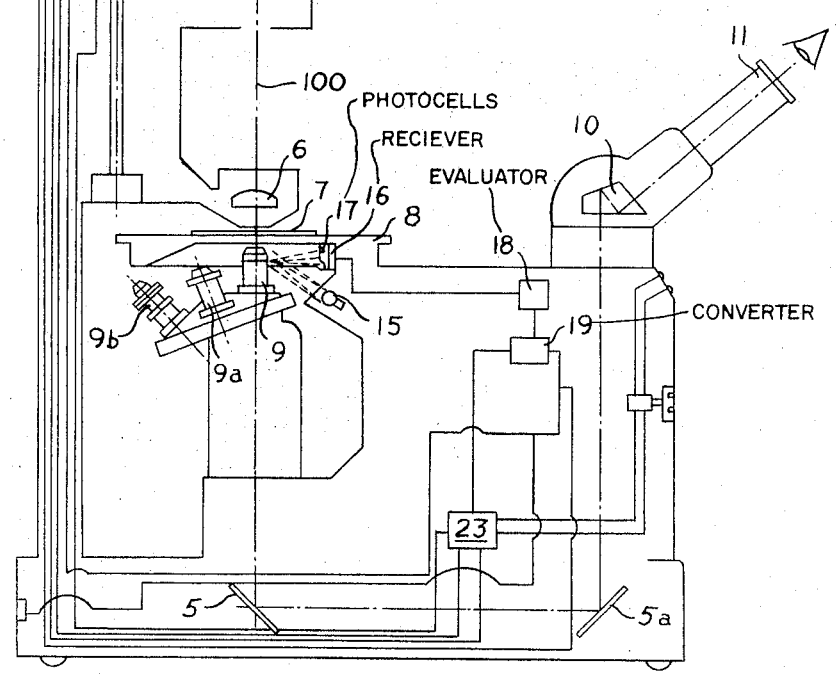

MICROSCOPE TRANSMITTING LIGHT ILLUMINATION SYSTEM USING THE KOHLER SYSTEM

BACKGROUND OF THE INVENTION

This invention relates to a method of using Kohler's principle of illumination with microscopes, particularly with transmitted-light microscopes, in which method the light transmittance of the illumination light path is adjusted to the respective objective lens by means of an optical system having a variable focal length.

To form an image which represents details of the specimen to be examined with high contrast, a suitable illumination of the specimen is required, which among other things fully and uniformly illuminates the field of view of the objective lens which is employed, with an aperture which is just as large as can be viewed by the objective lens.

In transmitted-light microscopy, this illumination is typically provided simply by means of a collector and a condenser, both of which have usually a fixed focal length. In such a system, each change of the objective lens involves a change of the field of view to be illuminated and of the aperture which is required. For this reason, the collector and condenser are designed for the largest field of view and the largest aperture which may be required. If the entire field of view which is available or the entire aperture is not required, a field iris diaphragm or aperture iris diaphragm is used or adjusted to avoid a glare on the microscopic field, which would result in a reduced contrast of the image.

This arrangement has the disadvantage that the full light transmittance of the illuminating system can never be utilized because it is necessary to illuminate either a large field with a small aperture or a small field with a large aperture.

For this reason it has been attempted to avoid this disadvantage by the use of illuminating systems which have a variable focal length so that the field and aperture can be varied continuously. Whereas such system enables an adjustment of the field and aperture to the respective objective lens with full utilization of the light transmittance, it is difficult always to find the correct setting because the field and aperture must be adjusted to the new objective lens by hand after each change of the objective lens. This manual adjustment is undesirable because it takes time and its accuracy depends on the attention and skill of the operator. This disadvantage arises particularly when comparative observations are to be carried out, which are to be reproduced, so that a given adjustment of the field and aperture to a given objective lens should be exactly reproducible after an intervening change of adjustment which may be due, for example to a change of the objective lens.

SUMMARY OF THE INVENTION

It is an object of the present invention to eliminate the above-mentioned disadvantages of said methods and to enable a satisfactory illumination in microscopes, particularly transmitted-light microscopes, with utilization of the entire light transmittance. This object is accomplished in that a change of the objective lens results automatically in a relative movement of the several lens element groups forming the illumination optical system having a variable focal length, and that the correct end position of these lens element groups, which results in an optimum utilization of the light transmittance by said objective lens, is detected and indicated, for example, by means of marks, luminous field or the like, or is received so that it can be transmitted to a remote location.

In accordance with the teachings of the invention, the steps to be performed in a predetermined specified sequence to adjust the illumination may be carried out in a single operation, and the numerous errors which may be due to an improper or inadequate adjustment by an operator may be avoided. Besides, considerable time is saved and the illumination for each objective lens can be exactly reproduced so that the operator of the microscope can concentrate entirely on the observation of a specimen without being unduly distracted by the technical requirements involved in the microscope.

The invention provides also an apparatus for carrying out the method. This apparatus is characterized in that members such as cams, rings and the like are provided on the objective lens-changing device or nosepiece; that at least one of the lens element groups forming the illumination optical system having a variable focal length is movable or displaceable; and that a drive adapted to be controlled by scanning and/or transmitting and control means automatically displaces at least one lens element group to the correct end position which is optimum for the objective lens which is employed.

In a further development of the invention, optical means are provided for scanning and/or transmitting and control and the drive is controlled in a non-contacting manner in response to the position assumed by the nosepiece or objective lens.

This arrangement results in the advantage that the overall size of the parts to be scanned does not exceed a predetermined dimension so that photodetector units of minimum size are sufficient and the location of these optical means in the free space adjacent to the parts to be scanned may be selected so that these optical means are substantially protected from an interference with their function by damage or an influence of stray or ambient light.

In another development of the invention, the nosepiece or the objective lenses are provided with marks, camwheels, rings or the like, which are replaceable or variable, and the stand of the microscope is provided with at least one electrical, electromechanical, or mechanical scanning or transmitting and control means, such as a lever, a camwheel, a contact block or the like, and at least one intermediate member for displacing at least one lens element group.

In this connection, it will be desirable that in case of a frequent change of the objective lens or the nosepiece, the reference required in each case to the scanning or transmitting and control means is effected in a simple and reliable manner by a change or adjustment of the corresponding camwheels, rings and the like, and the remaining scanning means need not be readjusted.

Further features and advantages of the method according to the invention as well as means for carrying out said method will be explained hereinafter for better understanding with reference to the drawings. In that description, various optical and electric components, such as photodetectors, controllers, receivers, and the

3 like can be used in numerous forms and for this reason are not considered as forming part of the invention as far as their details are concerned. These components will be described or explained only inasmuch as this is required for an explanation of the invention.

DRAWING

FIG. 1 is a side elevation showing a microscope provided with an arrangement according to the invention.

FIG. 5 shows how the invention may be applied to an inverted microscope and makes clear that the invention is not restricted to the microscopes of a certain structural type.

DESCRIPTION

Figure 2:
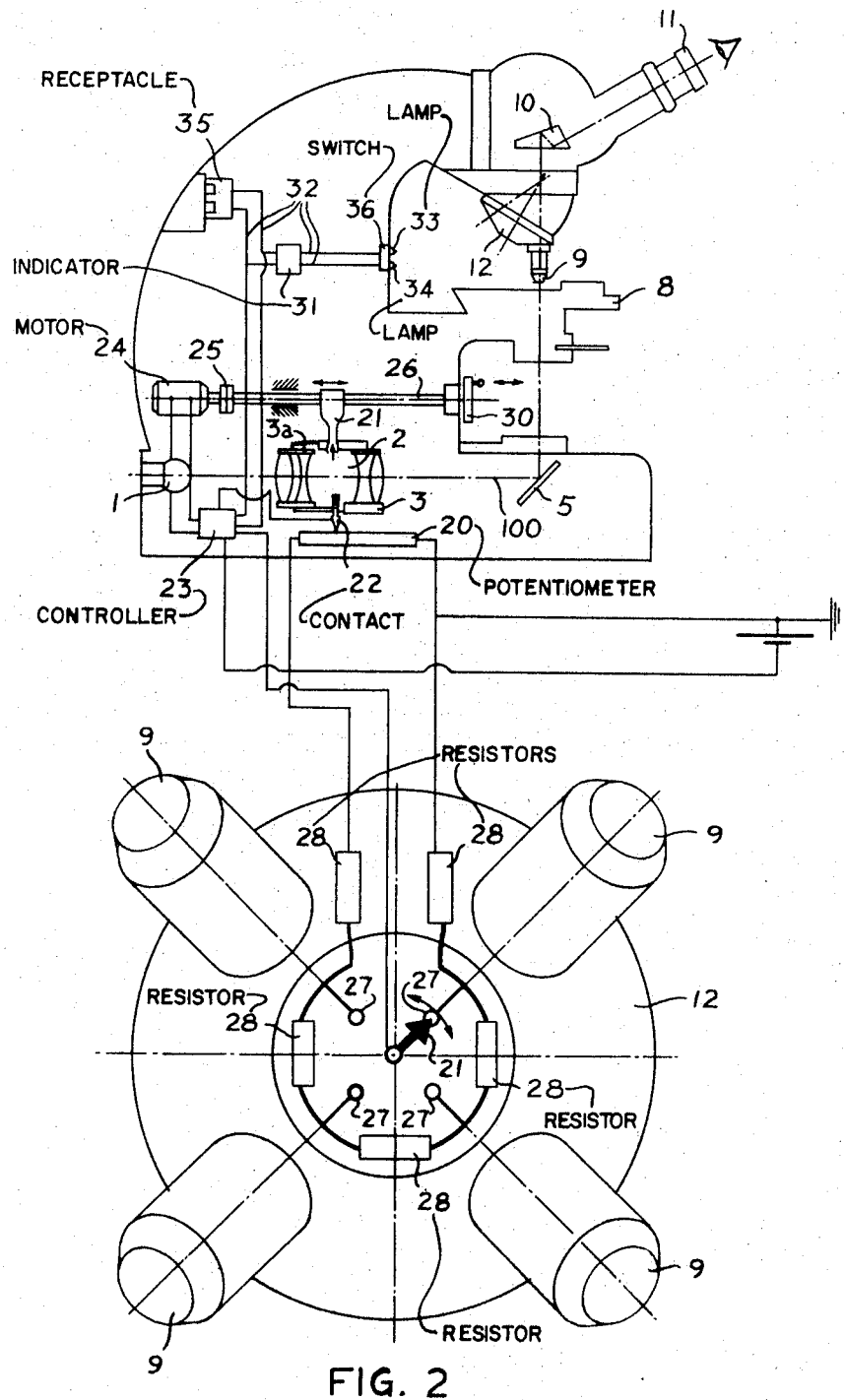
FIG. 2 is a side elevation showing a microscope provided with another embodiment of the arrangement according to the invention and with a nosepiece which is shown on a larger scale.

The instrument shown in FIG. 1 is a transmitted-light microscope which comprises an illuminating system having a continuously variable focal length and a transmitting system which is interposed in the microscope frame between the microscope nosepiece and a movable lens element group, and which comprises optical means for scanning and transmitting and for controlling said movable lens element group in dependence on the nosepiece.

The illuminating light path 100 extends from a lamp 1 through optical elements not shown and through a lens system 2 having a variable focal length. The several lens element groups 2a and 2b of said lens system 2 are held by guide elements 3 and 3a so as to be displaceable and adjustable relative to each other and can be clamped together by a clamping element 4 so that they can be moved as a single lens element group relative to the lamp 1. The illuminating light path then extends to a deflecting mirror 5 and from mirror 5 through a condenser 6 to the specimen 7 lying on a stage 8. The path of light for observation extends from the specimen 7 through an objective lens 9, in operative position, and a deflecting prism 10 into an eyepiece 11. The objective lenses are carried by an objective lens-changing device or nosepiece 12, which is provided on its outside, for example, on the outside diameter of an annular disk 13, with marks, or with grooves or cams 14 which are dulled in different degrees or have different reflection characteristics. These marks or grooves 14 are illuminated or irradiated by a lamp 15 and, depending on their reflectivity, reflect the incident light rays onto a receiver 16, which comprises a multiplicity of light sensitive cells or photocells 17. Depending on which or how many marks of the nosepiece reflect the light rays from the lamp 15, or depending on the variation of the intensity of the several reflected light rays, the reflected light will be received by the receiver 16 at cells in different numbers or at different locations, and this reception will be indicated to an evaluator 18.

4

To change the objective lens, the nosepiece 12 is rotated and the marks, grooves 14 or the like which are associated with the respective objective lenses are moved into the illuminating range of the lamp 15 and are irradiated and reflect the incident light in a manner which is peculiar to the objective lens that has just been turned to its operative position. Specific photocells 17 of the receiver 16 will then receive this reflected light and will indicate the reception to the evaluator 18, which supplies this information to a data converter 19 which generates a set point in response to this information.

The lens system 2 is carried by a movable carrying arm 21 to which is also mounted a sliding contact 22. Contact 22 is associated with a potentiometer 20 and derives from said potentiometer an actual value, which is compared in a controller 23 with the set point generated by the converter 19. As soon as a difference or error signal between the set point and actual value is detected, the controller 23 starts a reversible motor 24. The latter is coupled by a clutch 25 to a screw 26 and in dependence on its sense of rotation moves the carrying arm 21 and the lens system 2 in unison with the sliding contact 22 until the actual value which is sensed agrees with the predetermined set point. As soon as the actual value corresponds to the predetermined set point, at least one lens element group f the system 2 having a variable focal length will be in its correct end position so that the optimum illumination for the respective objective lens has been adjusted.

Another embodiment of the invention is shown in FIG. 2, where the rotatable nosepiece 12 and the scanning, transmitting and control means are arranged in a common switching circuit, whic serves as a servocontrol device for an electric motor drive. Near the center of the nosepiece 12, a plurality of stationary resistors 28 are mounted as well as rotatable sliding contact 29, which is connected to the nosepiece 12 for rotation therewith. Whenever the nosepiece 12 is rotated to change the objective lens, the sliding contact 29 follows said rotation and is thus moved into electrical contact at one of several contact points 27 which are electrically connected between the resistors 28. Each contact between movable element 29 and one of the contact points 27 is associated with the respective objective lens so that a changed voltage representing the set point is derived and applied to a controller 23. At the same time, a sliding contact 22 carried by the lens element group 2 is in contact with a potentiometer 20 and applies to the controller 23 a voltage representing the actual value. In response to a difference between the set point and the actual value, the controller 23 starts the motor 24 to displace by means of the screw 26, the carrying arm 21 which carries the lens system 2 and to displace at the same time at least one lens element group until the actual valve derived from the potentiometer 20 agrees to the set point derived from the respective resistor 28 so that the optimum illumination for the respective objective lens has been adjusted.

FIG. 2 also shows a handwheel 30, which is provided with a measuring scale or graduations and by means of which the screw 26 can be longitudinally displaced to such an extent that it is separated from the motor 24. In this way the sliding contact 22 and the lens system 2 may be manually adjusted relative to the lamp 1. This arrangement has the further advantage that in case of a failure of the motor or of the power supply the appliance will not be rendered inoperative but will remain in an operative condition.

FIG. 2 also shows an indicating device 31, which is disposed in the field of view of the operator. This indicating device 31 is connected by leads 32 to the controller 23 and serves to indicate or display whether and when the lens system 2 has reached the correct end position which is associated with the respective objective lens. In the embodiment shown by way of example, this indicating device 31 is represented by two lamps 33 and 34, which may differ in color, form, or brightness. The arrangement may be such that only one lamp is lighted continuously until the correct end position has been reached, and that both lamps are lighted or both lamps are extinguished when the correct end position has been reached. Alternatively, the two lamps may initially be lighted in alternation whereas both are extinguished or both are lighted continuously when the correct end position has been reached. Leads 32 also lead to a pick-up device 35, which enables a transmission of a signal indicating the correct adjustment to a remote location, for example, in conjunction with a fluorescent screen, projector or television screen on which the microscope image is represented.

This indication at a remote location may be effected alone, in which case only the leads 32 are used and they are separated from the indicating device 31 by the break switch 36, or simultaneously so that the indication can be watched both by the operator of the microscope and by a viewer of a flourescent screen or the like which is connected to the microscope.

It will be understood that the correct adjustment may be audibly indicated and such audible indication may be effected at a remote location, for instance, if the visual indicating device 31 is replaced by a device for generating different buzzing tones.

Figure 3:
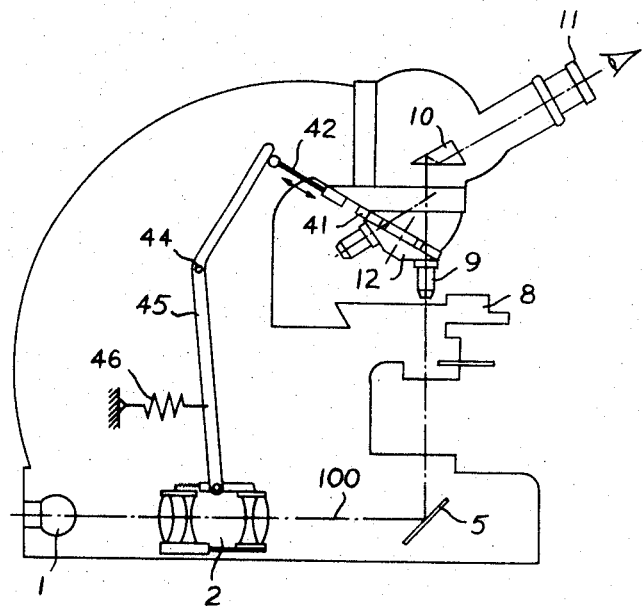
FIG. 3 shows a further embodiment of the invention comprising mechanical scanning and control means.
Figure 4:
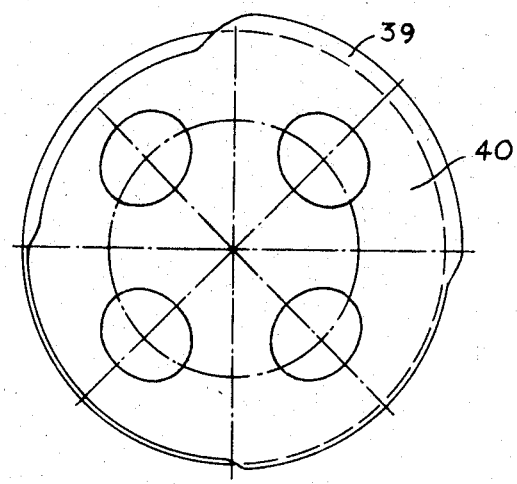
FIG. 4 shows, on an enlarged scale, a cam disc which can be mounted on the nosepiece of FIG. 3 and is provided with elevations and depressions in various shapes.

Another practical embodiment of the invention is shown in FIGS. 3 and 4 where scannable surfaces 39 in the form of cams are provided directly on the nosepiece 12 or, as is shown on a larger scale in FIG. 4, additional discs or rings 40 may be selectively mounted on the objective lens-changing device and may be provided with different scannable surfaces 39 in the form of run-up or run-down ramps. These scannable surfaces 39 are scanned by a scanning member or mechanical cam follower linkage 42, which is provided with friction-reducing means 41, such as a slide block, rollers, balls, and the like, and which is mounted for movement relative to cam surface 39 in a reciprocal direction as indicated. The scanning results in reciprocal movements of the scanning member 42 and these movements are transmitted to the lens system 2 by means of a lever 45 pivoted about a fulcrum 44 which is fixed to the microscope frame. As a result, the lens system 2 is displaced to the position which corresponds to the respective objective lens. In this arrangement, an exact engagement without backlash is ensured by a tension or pressure-applying member, which in the present case consists of a tension spring 46.

FIG. 5 shows how the invention can be applied to an inverted microscope. The illuminating light path extends again from the lamp 1 via optical elements, not shown, and through the adjustable lens system 2 and the condenser 6 onto the specimen 7, which rests again on the stage 8. The path of light for observation extends from the specimen 7 through an objective lens 9 in operative position and thence to deflecting morrors 5 and 5a, to prism 10 and into eyepiece 11. Objectives 9, 9a, 9b, and possibly additional ones, which are not shown, are carried by the nosepiece 12 and are distinguished from each other by means of replaceably mounted rings 53. The rings 53 are either made from materials having different reflecting characteristics or are added to the objectives in different numbers. Rings 53 are illuminated by the lamp 15. Owing to the different reflecting characteristics of these rings, whether from numbers of rings or their materials, the light-sensitive cells 17 of the receiver 16 receive different proportions of reflected light rays depending on the objective lens which is in operating position. In response to a change of the objective lens, the operation is repeated as described in connection with the FIG. 1 embodiment of this invention.

It will be understood that the invention is not restricted to the components shown and described and that the principle can also be applied to reflected-light microscopes and numerous modifications are possible without departing from the basic concept of the present invention.

What is claimed is:

1. A microscope having a frame and a specimen stage and including a rotatable nosepiece and an eyepiece mounted relative to said stage in optical alignment along a viewing axis, said nosepiece including a plurality of objective lenses having different illumination requirements and being selectively positionable on said viewing axis, said microscope being characterized by the following improvement:

an illumination system including, in optical alignment along an illumination axis, a light source, a condenser, and a variable focal length lens system between said light source and said condenser, said variable focal length lens system having a lens element moveable along said illumination axis, said lens element being connected to a motor for translation in either direction along said illumination axis, said motor being responsive to a control signal, a reference signal generator including a plurality of reflective surfaces, each of said reflective surfaces being associated with and adapted to identify a separate one of said plurality of objective lenses by reflecting only a predetermined portion of an incident beam of light so as to provide a coded reflected beam, a signal light source positioned to illuminate one of said reflective surfaces when the corresponding objective lens is on said viewing axis, a detector positioned to receive and respond to illumination reflected from the reflective surface, said detector generating a reference signal having a characteristic peculiar to the particular objective lens in said viewing axis, a potentiometer for generating a position signal having a contact mounted on said lens element thereby providing a characteristic signal peculiar to the actual position of the lens element, a controller connected to said reference signal generator and potentiometer, said controller comparing the peculiar characteristics of the reference signal and the position signal and providing a control signal to said motor when the peculiar characteristics differ so as to move said lens element until a null is attained whereby a predetermined position of said lens element is reached to provide the proper illumination for the selected objective lens.

* * * * *